US012810825B2

(12) United States Patent
Mosheim

(10) Patent No.: US 12,810,825 B2
(45) Date of Patent: Nov. 24, 2026

(54) BANJO SUSTAINER

(71) Applicant: Overtone LLC, Dorset, VT (US)

(72) Inventor: William Mosheim, Dorset, VT (US)

(73) Assignee: OVERTONE LLC, Dorset, VT (US)

( * ) Notice: Subject to any disclaimer, the term of this patent is extended or adjusted under 35 U.S.C. 154(b) by 318 days.

(21) Appl. No.: 18/651,587

(22) Filed: Apr. 30, 2024

(65) Prior Publication Data

US 2024/0371343 A1 Nov. 7, 2024

Related U.S. Application Data

(60) Provisional application No. 63/499,557, filed on May 2, 2023.

(51) Int. Cl.
*G10D 3/06* (2020.01)
*G10D 1/10* (2006.01)

(52) U.S. Cl.
CPC ................. *G10D 3/06* (2013.01); *G10D 1/10* (2013.01)

(58) Field of Classification Search
CPC .. G10D 3/06; G10D 1/10; G10D 3/00; G10D 1/00
See application file for complete search history.

(56) References Cited

FOREIGN PATENT DOCUMENTS

| | | | | |
|---|---|---|---|---|
| GB | 2524001 A | * 9/2015 | ............... | G10D 3/00 |

* cited by examiner

*Primary Examiner* — Kimberly R Lockett
(74) *Attorney, Agent, or Firm* — Dentons Durham Jones Pinegar; Lilly Godfrey

(57) ABSTRACT

This disclosure relates generally to a kit or system for providing support to a rim of a banjo and can include: a dowel stick with two opposing notches disposed at a distal end; a threaded insert to be received by the distal end of the dowel stick; a neck brace having a body and two opposing protrusions extending from the body, the two opposing protrusions for interfacing with the two opposing notches of the dowel stick, the neck brace to be positioned between the dowel stick and an interior surface of the rim; and a bolt for securing the dowel stick and neck brace to the interior surface of the rim, the bolt extending through the rim of the banjo and the neck brace to be received by the threaded insert, the dowel stick providing support to a neck of the banjo in a vertical direction and a lateral direction.

18 Claims, 6 Drawing Sheets

BANJO SUSTAINER

CLAIM FOR PRIORITY

A claim for priority to the May 2, 2023 filing date of U.S. Provisional Patent Application No. 63/499,557, titled "BANJO SUSTAINER" (the '557 Provisional Application), is hereby made pursuant to 35 U.S.C. § 119(e). The entire disclosure of the '557 Provisional Application is hereby incorporated herein.

TECHNICAL FIELD

This disclosure relates generally to musical instruments and hardware for musical instruments, such as banjos.

SUMMARY

Disclosed are systems, devices, kits, and/or methods of use thereof regarding musical instruments and hardware for musical instruments, such as banjos. For example, disclosed are kits and various components for providing support to a rim of a banjo. In various aspects, disclosed kits include a dowel stick, the dowel stick having two opposing notches disposed at a distal end of the dowel stick, and at least one threaded insert to be received by the distal end of the dowel stick. The kits may also include a neck brace having a body and two opposing protrusions extending from the body, the two opposing protrusions for interfacing with the two opposing notches of the dowel stick, where the neck brace may be positioned between the dowel stick and an interior surface of the rim of a banjo. The kits may further include a bolt for securing the dowel stick and the neck brace to the interior surface of the rim, where the bolt may extend through the rim of the banjo and the neck brace to be received by the threaded insert. Once installed, the dowel stick provides support to a neck of the banjo in a vertical direction and a lateral direction.

In some embodiments, disclosed kits may include a dowel stick, the dowel stick having a notch disposed near a distal end of the dowel stick, and a threaded insert to be received by the dowel stick. The kits may also include a neck brace having a body and at least one protrusion extending from the body, the at least one protrusion for interfacing with the notch of the dowel stick, where the neck brace can be positioned between the dowel stick and an interior surface of the rim of a banjo. The kits may further include a bolt for securing the dowel stick and the neck brace to the interior surface of the rim.

Other aspects of the disclosed subject matter, as well as features and advantages of various aspects of the disclosed subject matter, should be apparent to those of ordinary skill in the art through consideration of the ensuing description, the accompanying drawings, and the appended claims.

DETAILED DESCRIPTION

Figure 1:
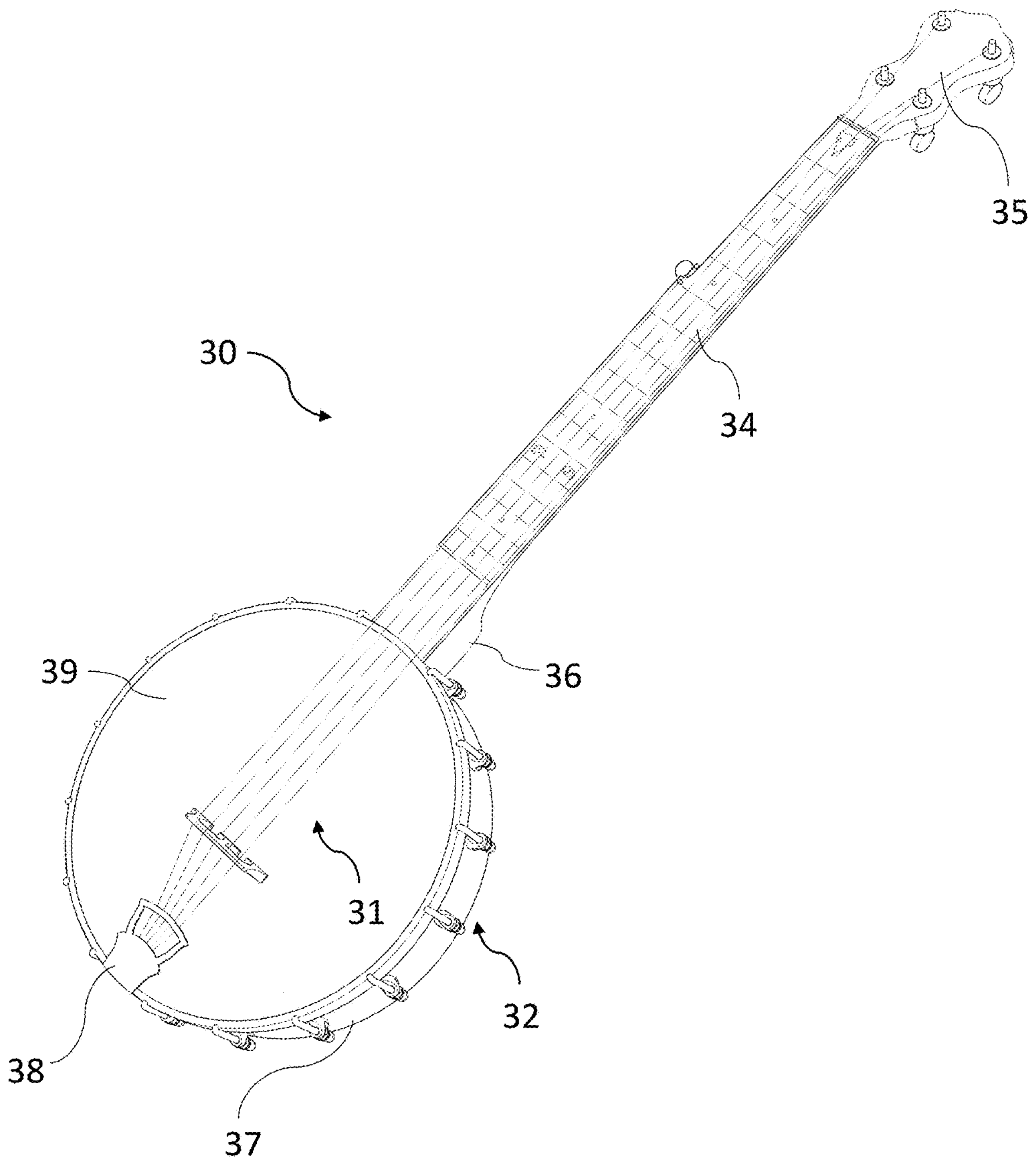
FIG. 1 illustrates a perspective view of a banjo.

Stringed instruments typically include a neck or fingerboard attached to a body of the instrument, such as a pot assembly for a banjo or the body of a guitar. Strings extend under tension from one end of the instrument to the other. For example, at the distal end of the fingerboard (or furthest end from a player), tuners are mounted on a head stock or peg head and are wrapped with the strings to provide them with tension. The strings extend across the pot assembly or body to, for example, a tailpiece to be anchored to the body of the instrument. This extension of the strings across substantially the entirety of the instrument and the tension of the strings allows sounds to be produced when the strings are manipulated (e.g., through bowing, strumming, picking, etc.).

While the tension of the strings allows the instrument to be played, the tension also has a tendency to warp various components of the instruments. For example, the tension of the strings pulls on the neck, the heel, and/or the rim.

In various aspects, disclosed kits include a dowel stick, the dowel stick having two opposing notches disposed at a distal end of the dowel stick, and at least one threaded insert to be received by the distal end of the dowel stick. The kits may also include a neck brace having a body and two opposing protrusions extending from the body, the two opposing protrusions for interfacing with the two opposing notches of the dowel stick, where the neck brace may be positioned between the dowel stick and an interior surface of the rim of a banjo. The kits may further include a bolt for securing the dowel stick and the neck brace to the interior surface of the rim, where the bolt may extend through the rim of the banjo and the neck brace to be received by the threaded insert. Once installed, the dowel stick provides support to a neck of the banjo in a vertical direction (i.e., along a longitudinal axis of the dowel stick) and a lateral direction (i.e., along a tangential axis of the rim).

In some embodiments, disclosed kits may include a dowel stick, the dowel stick having a notch disposed near a distal end of the dowel stick, and a threaded insert to be received by the dowel stick. The kits may also include a neck brace having a body and at least one protrusion extending from the body, the at least one protrusion for interfacing with the notch of the dowel stick, where the neck brace can be positioned between the dowel stick and an interior surface of the rim of a banjo. The kits may further include a bolt for securing the dowel stick and the neck brace to the interior surface of the rim.

Disclosed kits, devices, and methods allow for a banjo neck to be easily and quickly bolted onto a rim assembly through a dowel stick (e.g., a rectangular dowel stick) to support the rim and keep the traditional look of the placement and style of the dowel stick. Along with added case of neck attachment and eliminating the need for a traditional mortise and tenon joint, the disclosed kits, devices and methods balance tensions created in conventional attachment methods and supports the rim from distorting in ways that traditional neck attachment hardware does not.

FIG. 1 illustrates a perspective view of a banjo 30. The banjo 30 includes a pot assembly 32, a neck 34, a peg head or head stock 35, and a tailpiece 38. The peg head 35 is referred to herein as the distal most end of the banjo 30 and the tailpiece 38 is referred to herein as the proximal most end of the banjo 30. The pot assembly 32 includes a rim 37 and a head 39, among other components. Where the neck 34 meets the rim 37 is a heel 36.

Strings 31 extend from the peg head 35 (where they are wrapped around tuning pegs) to the tailpiece 38. This extension of the strings 31 from the proximal end to the distal end of the banjo 30 places the strings 31 under tension. This tension is desired to allow the strings 31 of the banjo 30 to be manipulated and make musical sounds (the tension is tuned so the strings 31 vibrate to the correct wavelength to make the appropriate tone). However, this tension on the strings 31, from the peg head 35 to the tailpiece 38, also has a tendency to warp various components of the banjo 30, such as the neck 34 and the rim 37.

Figure 2A:
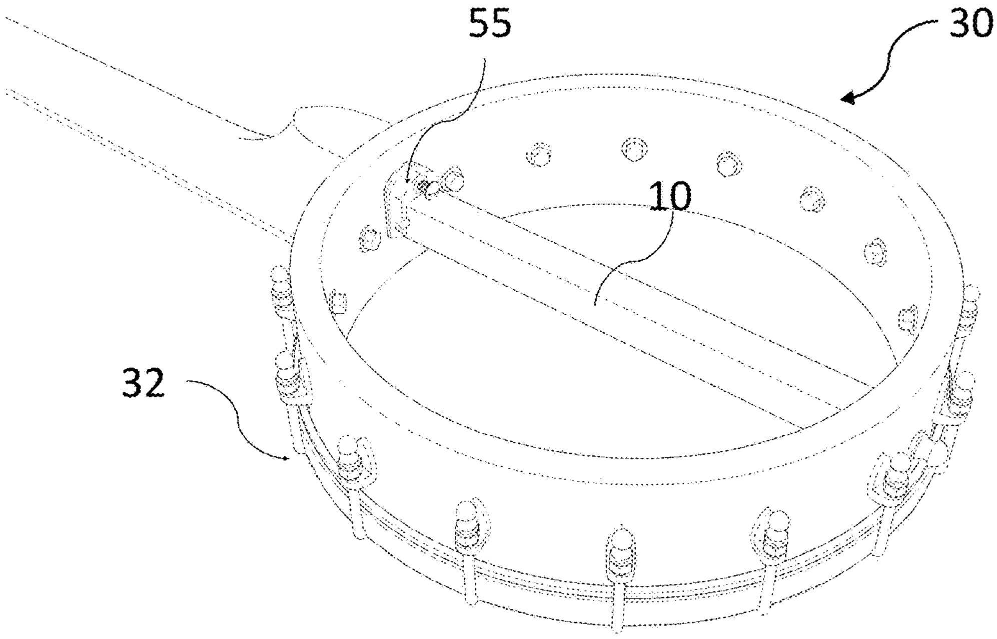
FIGS. 2A through 2C illustrate conventional support hardware.
Figure 2B:
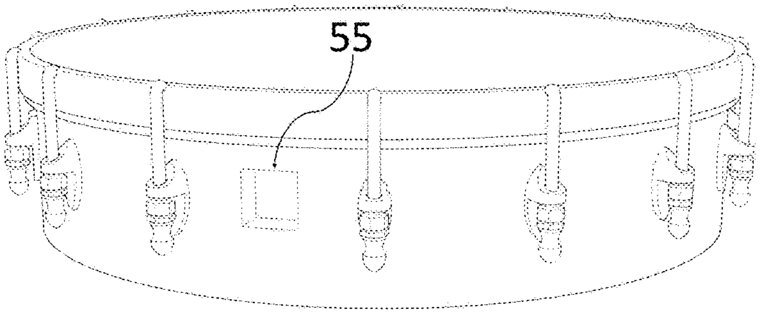
Figure 2C:
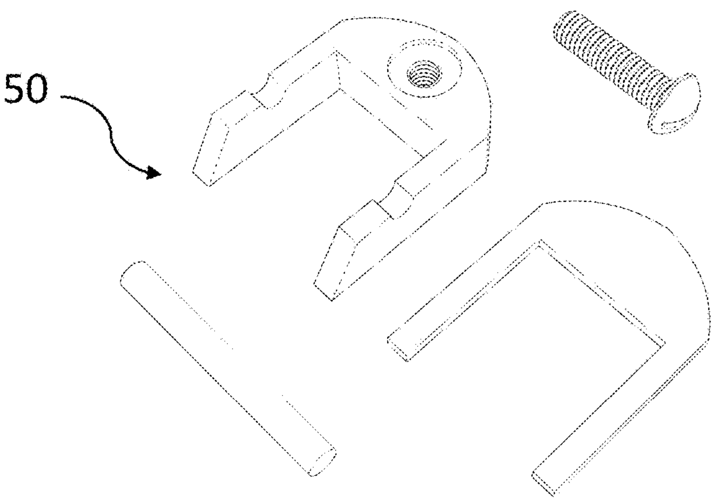

FIGS. 2A to 2C illustrate conventional support hardware 50 typically used to install a dowel stick 10 in a banjo 30. Specifically, FIG. 2A illustrates a conventional dowel stick 10 installed within a pot assembly 32 of a banjo 30. Conventional hardware 50 and attachment methods incorporate U-style dowel attachment hardware (see FIG. 2C) causing tensions in the banjo 30 to be placed in the opposite direction of desired neck stability. Conventional methods also do not support the rim 37 of the banjo 30 in between the dowel stick 10 and the head (part of the banjo's 30 pot assembly 32), where most of the string tension is found on the neck joint. Additionally, large holes 55 (see FIG. 2B) must be cut out of the rim 37 when using a conventional mortise and tenon set dowel stick. Specifically, a large hole or notch 55 (the mortise) is cut out of the rim 37 to receive a corresponding protrusion of the dowel stick 10 (the tenon). The necessary inclusion of large holes 55 makes the rim 37 much weaker at points where the rim 37 needs to be the strongest to resist the string tensions. This can cause the rim to warp over time which requires time-consuming and costly repairs to correct.

Figure 3:
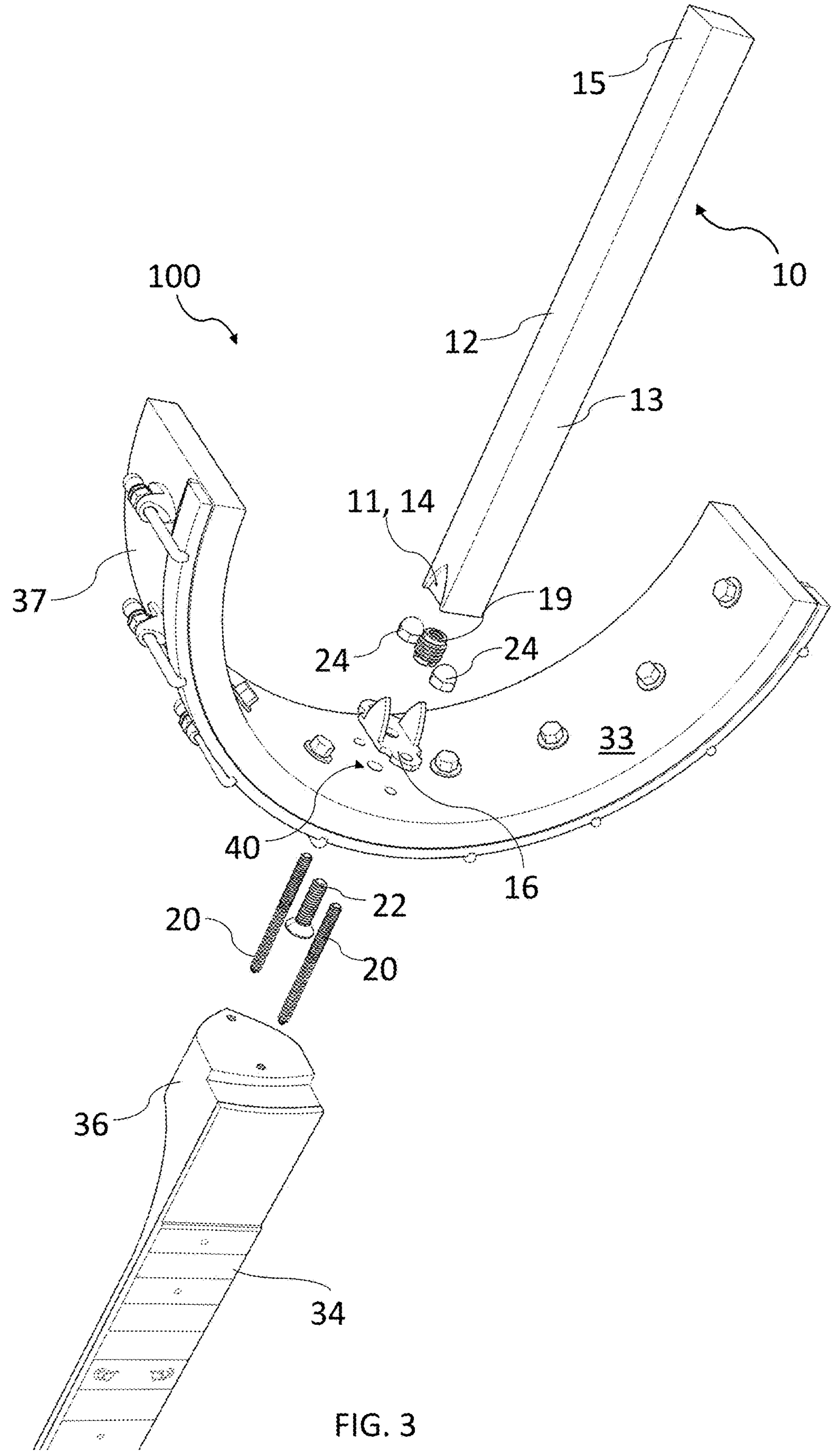
FIG. 3 illustrates an exploded view of a system for providing support to a banjo, according to the present disclosure.

FIG. 3 illustrates an exploded view of a system 100 for providing support to a banjo 30, according to the present disclosure. As illustrated, the system 100 includes a dowel stick 10, a neck brace 16, a threaded insert 19, hanger bolts 20, and a bolt 22 to be installed about a banjo rim 37. The threaded insert 19 can be received by a distal end 14 of the dowel stick 10. In some embodiments, the system 100 includes a first threaded insert and a second threaded insert received by a proximal end 15 of the dowel stick 10. The second threaded insert 19 can facilitate attachment of the proximal end 15 of the dowel stick 10 to the interior of the rim 37.

In some embodiments, the dowel stick 10 includes a notch 11 at the distal end 14 of the dowel stick 10. One, two, or more notches can be provided. In one embodiment, the dowel stick 10 can include two opposing notches 11. The dowel stick 10 has a surface 12 that defines or includes the notch 11, and a surface 13 that is smooth and does not have any notches 11. In some embodiments, the dowel stick 10 includes two notches 11 on opposing surfaces 12. In some embodiments, the neck brace 16 is received, engaged by, or otherwise interfaces with the at least one notch 11 and/or the distal end 14 of the dowel stick 10. In some embodiments, the notch 11 is sized and shaped to correspond to components (e.g., protrusions) of the neck brace 16.

Also illustrated are a plurality of holes 40 defined within the rim 37 of the banjo 30. In some embodiments, the holes 40 receive the hanger bolts 20 and/or the bolt 22. As discussed with respect to FIG. 4, the neck brace 16 also includes holes to receive the hanger bolts 20 and/or the bolt 22. In some embodiments, the holes 40 are substantially aligned with the holes of the neck brace 16, allowing the hanger bolts 20 and/or the bolt 22 to extend through the rim 37 of the banjo 30, thereby anchoring and attaching the system 100 to the banjo 30.

As illustrated, the dowel stick 10 is rectangular and does not have a tenon protrusion, as in conventional dowel stick hardware. Also in contrast to conventional dowel stick hardware, the rim 37 of the banjo 30 has small holes 40 as opposed to a large hole (the mortise 55) used with conventional dowel stick hardware. The system 100 allows the dowel stick 10 to be attached and placed within the rim 37 of the banjo 30, without weakening the rim 37 or requiring large holes to extend through the rim 37. When installed, the neck brace 16 will abut and rest against the interior surface 33 of the rim 37 while being anchored through the bolt 22. The heel 36 and the neck 34 are anchored to the rim 37 via the hanger bolts 22 and the acorn nuts 24.

Figure 4:
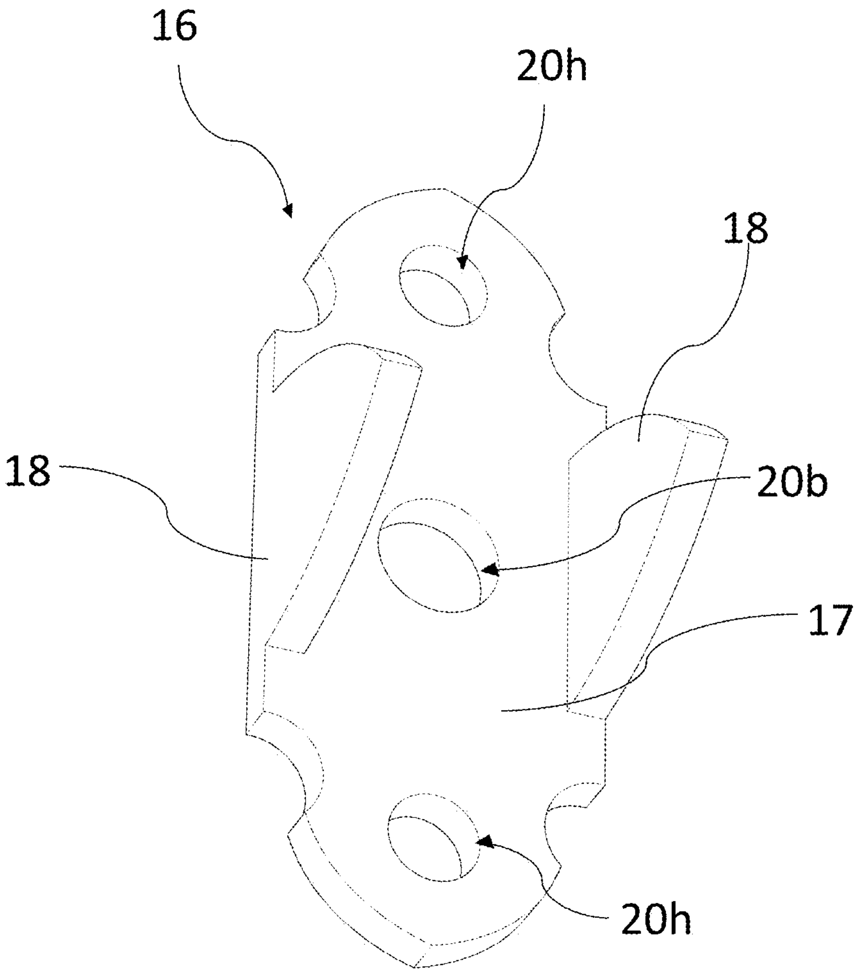
FIG. 4 illustrates one configuration of a neck brace, according to the present disclosure.

FIG. 4 illustrates one example of a neck brace 16, according to the present disclosure. The neck brace 16 includes a body 17 that, in some embodiments, defines various holes to receive various bolts. For example, the body 17 defines holes 20*h* to receive hanger bolts 20 and hole 20*b* to receive the bolt 22. When installed within a pot assembly 32 of a banjo 30, the hanger bolts 20 can extend through the holes 20*h* and into the neck 34. One or more acorn nuts 24 (or other appropriate type of nut 24) anchor the hanger bolts 20 to the rim 37 of the banjo 30. The bolt 22 extends from an exterior of the rim 37 through the rim 37, through the hole 20*b* of the body 17 of the neck brace 16, and engages with the threaded insert 19 received within the distal end 14 of the dowel stick 10.

Extending from the body 17 are protrusions 18. The protrusions 18 are sized, shaped, and placed such that they can be received, engaged by, or otherwise interface with the dowel stick 10 (e.g., notch 11 and/or the distal end 14). When the neck brace 16 is received and engaged by the notch 11 of the dowel stick 10, and the dowel stick 10 with the neck brace 16 is installed within a pot assembly 32 of a banjo 30, the neck brace 16 cantilevers the dowel stick 10. In this way, the system 100 prevent warping of the rim 37 due to string tension.

Figure 5A:
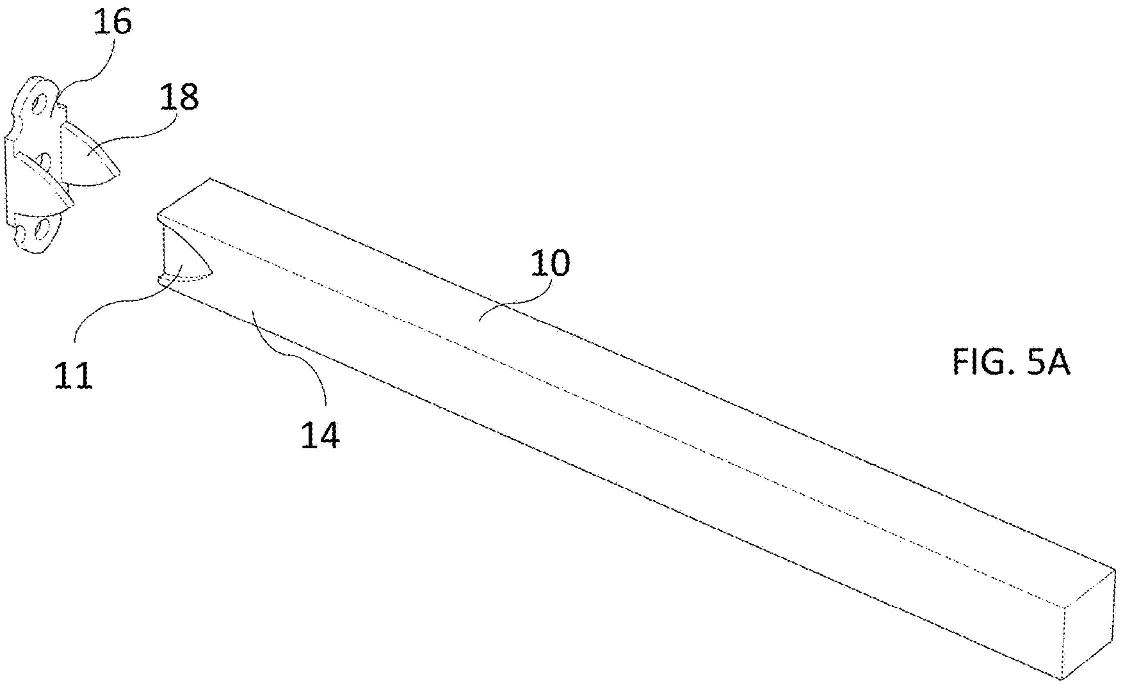
FIG. 5A illustrates a close-up view of an unassembled neck brace and dowel stick.
Figure 5B:
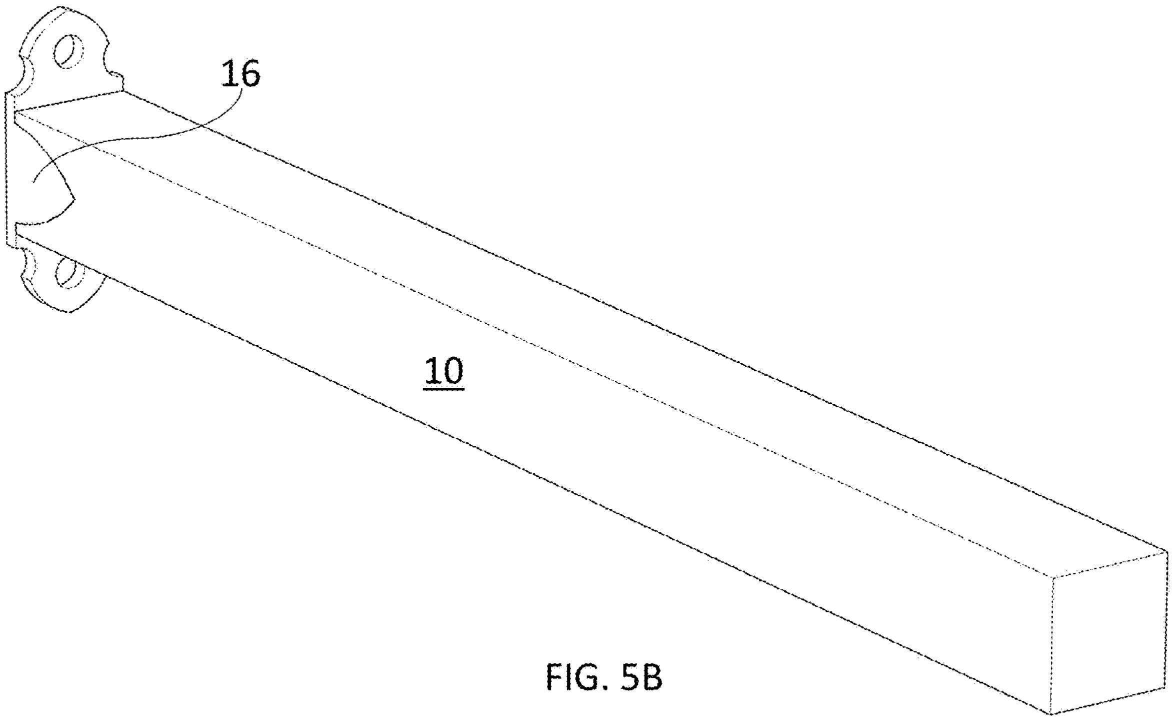
FIG. 5B illustrates a close-up view of an assembled neck brace and dowel stick.

FIG. 5A illustrates a close-up view of an unassembled neck brace 16 and dowel stick 10, and FIG. 5B illustrates a close-up view of an assembled neck brace 16 and dowel stick 10. The notches 11 are clearly visible at the distal end 14 of the dowel stick 10. In some embodiments, such as illustrated, the notches 11 are substantially triangular in shape and correspond to the shape of the protrusions 18 of the neck brace 16. When installed at the distal end 14 of the dowel stick 10, the protrusions 18 are received by the notches 11. The protrusions 18 can be substantially flush with surfaces of the dowel stick 10 when received by the notches 11. The protrusions may be proud (e.g., extend past the surface just a bit) with surfaces of the dowel stick 10 when received by the notches 11. The protrusions may be shy (e.g., inset from the surface) with surfaces of the dowel stick 10 when received by the notches 11.

Figure 6:
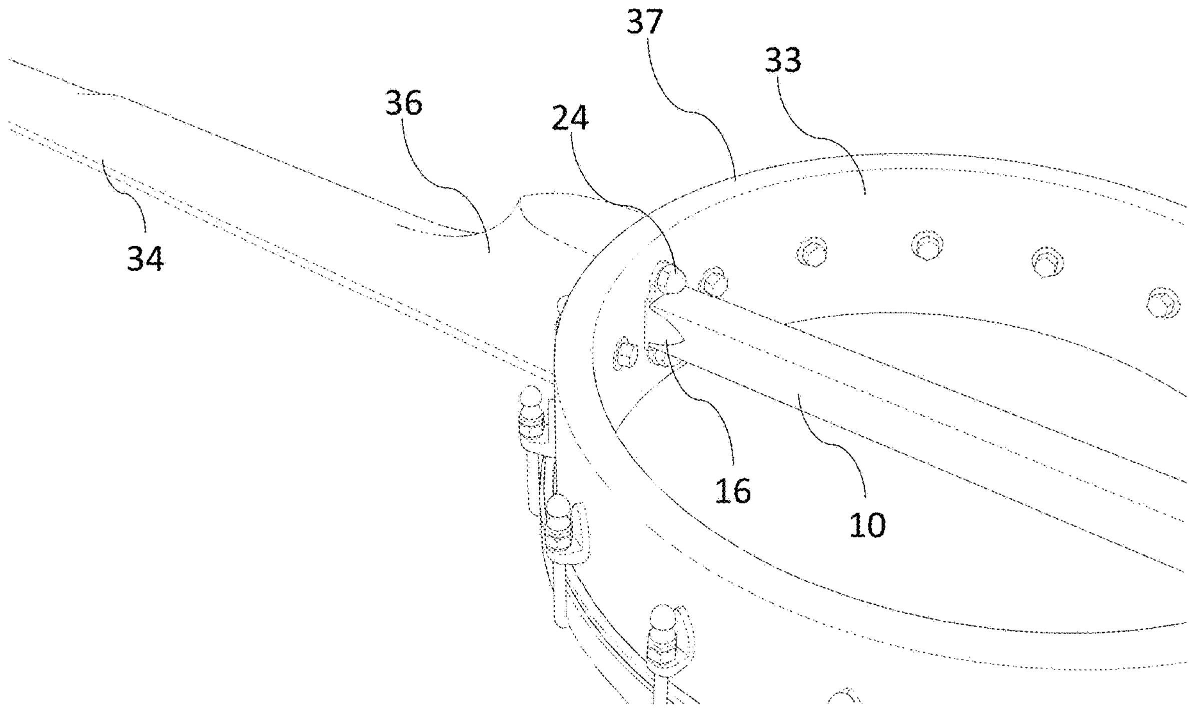
FIG. 6 illustrates an embodiment of the system of FIG. 3 installed on an instrument.

FIG. 6 illustrates one example of the system 100 of FIG. 3 installed on/in an instrument. When installed, the neck brace 16 rests against the interior 33 of the rim 37. Acorn nuts 24 anchor and attach hanger bolts 20 (not visible) to the neck brace 16, thereby anchoring and attaching the heel 36 (and the neck 34) to the rim 37. In this way, the dowel stick 10 can provide support to the rim 37 and balance the tensions imparted to the banjo 30 via the strings 31.

The disclosed kits and/or systems support the rim 37 of the banjo 30 on the upper and lower sides of the dowel stick 10 supporting the neck joint. Additionally, the dowel stick 10 and rim 37 are cantilevered by the neck brace 16 being inlayed into the sides of the dowel stick 10. This balances the tension created when attaching the neck 34 to the rim 37 of the banjo 30, lessening the tension on the dowel stick 10 itself, and eliminating traditional glued mortise and tenon joints completely. Further, disclosed kits and/or systems allow the neck 34 to be removed and reset much faster and easier than a traditional mortise and tenon dowel stick joint. This beneficially eliminates the need for timely and expensive repairs in the future. If the neck joint ever needs to be adjusted or repaired, the time it would take can be greatly reduced and the work will be much easier to accomplish. This also allows for the use of neck shims to be used to adjust the neck angle without placing unnecessary pressure on the rim 37 that may cause it to warp.

Still further, disclosed kits and/or systems utilize threaded inserts 19 in each end of the dowel stick 10, making almost all of the hardware mechanical in nature. Hanger bolts 20 are screwed into the neck 34, which are the only wood screw attachments used. In some embodiments, the neck brace 16 can be made from U-channel brass and machined to specific specifications and/or shapes. This allows the neck brace 16 to be utilized in a range of banjo 30 sizes and specifications while still (i) cantilevering the tension on the rim 37 with the dowel stick 10 and (ii) balancing the tensions of the banjo 30, the rim 37, and the dowel stick 10. In some embodiments, the dowel stick 10 can be semi-permanently placed in the banjo rim 37 assembly instead of being glued in to the neck. This allows the dowel stick 10 to stay in place unless disassembly is required for repair or replacement of a banjo component. Additionally, this semi-permanent placement allows the banjo 30 to be broken down into smaller pieces, if needed.

Additional Terms and Definitions

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It should also be noted that some of the embodiments disclosed herein may have been disclosed in relation to a particular musical instrument (e.g., a banjo); however, other instruments (e.g., guitars, violins, etc.) are also contemplated. Structures or surfaces positioned closer to the body of the instrument are referred to as more "proximal" while surfaces or structures positioned further from the body and closer to the peg head or head stock are referred to as "distal."

In one embodiment, the terms "about" and "approximately" refer to numerical parameters within 10% of the indicated range. The terms "a," "an," "the," and similar referents used in the context of describing the embodiments of the present disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the embodiments of the present disclosure and does not pose a limitation on the scope of the present disclosure. No language in the specification should be construed as indicating any non-claimed element essential to the practice of the embodiments of the present disclosure.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments are described herein, including the best mode known to the author(s) of this disclosure for carrying out the embodiments disclosed herein. Of course, variations on these described embodiments will become apparent to those of ordinary skill in the art upon reading the foregoing description. The author(s) expects skilled artisans to employ such variations as appropriate, and the author(s) intends for the embodiments of the present disclosure to be practiced otherwise than specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of this disclosure so claimed are inherently or expressly described and enabled herein.

Although this disclosure provides many specifics, these should not be construed as limiting the scope of any of the claims that follow, but merely as providing illustrations of some embodiments of elements and features of the disclosed subject matter. Other embodiments of the disclosed subject matter, and of their elements and features, may be devised which do not depart from the spirit or scope of any of the claims. Features from different embodiments may be employed in combination. Accordingly, the scope of each claim is limited only by its plain language and the legal equivalents thereto.

What is claimed:

1. A kit for providing support to a rim of a banjo, the kit comprising:

a dowel stick, the dowel stick having two opposing notches disposed at a distal end of the dowel stick;

a threaded insert to be received by the distal end of the dowel stick;

a neck brace having a body and two opposing protrusions extending from the body, the two opposing protrusions for interfacing with the two opposing notches of the dowel stick, the neck brace to be positioned between the dowel stick and an interior surface of the rim; and a bolt for securing the dowel stick and the neck brace to the interior surface of the rim, the bolt extending through the rim of the banjo and the neck brace to be received by the threaded insert, the dowel stick providing support to a neck of the banjo in a vertical direction and a lateral direction.

2. The kit of claim 1, wherein the neck brace is inlaid with the dowel stick via the two opposing protrusions interfacing with the two opposing notches.

3. The kit of claim 1, wherein the neck brace is inlaid with the dowel stick and cantilevers tension on the rim using the dowel stick.

4. The kit of claim 1, wherein the body of the neck brace defines a hole for receiving the bolt.

5. The kit of claim 1, wherein the two opposing protrusions of the neck brace are flush or proud with a surface of the dowel stick when the two opposing protrusions interface with the two opposing notches.

6. The kit of claim 1, further comprising a second threaded insert to be received by a proximal end of the dowel stick.

7. The kit of claim 1, further comprising a hanger bolt for anchoring the neck to the rim of the banjo.

8. The kit of claim 7, wherein the body of the neck brace defines a hole for receiving the hanger bolt, such that the hanger bolt extends through the hole, through the rim, and into the neck of the banjo.

9. The kit of claim 7, further comprising an acorn nut for securing the hanger bolt.

10. A system for providing support to a rim of a banjo comprising:

a dowel stick, the dowel stick having a notch disposed near a distal end of the dowel stick;

a threaded insert to be received by the dowel stick;

a neck brace having a body and at least one protrusion extending from the body, the at least one protrusion for interfacing with the notch of the dowel stick, the neck brace to be positioned between the dowel stick and an interior surface of the rim;

at least one hanger bolt for securing a neck of the banjo to the rim of the banjo, the at least one hanger bolt to partially extend through the body of the neck brace and be anchored against the neck brace by an acorn nut; and a bolt for securing the dowel stick and the neck brace to the interior surface of the rim.

11. The system of claim 10, wherein the at least one protrusion of the neck brace comprises two opposing protrusions.

12. The system of claim 11, wherein the dowel stick has an opposing notch disposed near the distal end of the dowel stick and the two opposing protrusions interface with the notch and the opposing notch of the dowel stick.

13. The system of claim 10, wherein the neck brace comprises brass.

14. The system of claim 10, wherein the dowel stick comprises a surface defining the notch and a smooth surface with no notches.

15. A method of supporting a banjo rim, the method comprising:

positioning a neck brace between an interior surface of the banjo rim and a distal end of a dowel stick;

securing the distal end of the dowel stick to the neck brace;

securing a proximal end of the dowel stick opposite the distal end to the interior surface of the banjo rim; and securing a neck of the banjo to the banjo rim and the neck brace, wherein the neck brace is inlaid with the dowel stick and cantilevers tension on the rim using the dowel stick.

16. The method of claim 15, wherein securing the distal end of the dowel stick to the neck brace comprises:

aligning the opposing protrusions of the neck brace with opposing notches defined at the distal end of the dowel stick; and screwing a bolt through the neck brace and into a threaded insert positioned at the distal end of the dowel stick.

17. The method of claim 16, wherein the opposing protrusions of the neck brace are flush or proud with a surface of the dowel stick when the opposing protrusions interface with the opposing notches.

18. The method of claim 15, wherein securing a neck of the banjo to the banjo rim and the neck brace comprises:

screwing hanger bolts into the neck through the neck brace; and securing the hanger bolts with acorn nuts, the acorn nuts positioned against the neck brace.

* * * * *